US006804263B1

(12) United States Patent
Okawa (10) Patent No.: US 6,804,263 B1
(45) Date of Patent: Oct. 12, 2004

(54) CONTROLLING THE STATE OF A NODE CONNECTED TO A BUS DURING THE SELF IDENTIFICATION PHASE OF BUS ARBITRATION

(75) Inventor: Sumihiro Okawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 09/691,890

(22) Filed: Oct. 19, 2000

(30) Foreign Application Priority Data

Oct. 21, 1999 (JP) ............................................ 11-300214

(51) Int. Cl.[7] ................................................. H04J 1/00
(52) U.S. Cl. ..................................... 370/489; 710/100
(58) Field of Search ................................. 370/235, 393, 370/428, 252, 230, 231, 412, 429, 257, 912; 710/4, 9, 10, 52, 63, 100, 104, 106; 709/221, 222, 250, 253; 713/100; 714/49, 53, 799, 819, 821; 340/825.52

(56) References Cited

U.S. PATENT DOCUMENTS

| | | | |
|---|---|---|---|
| 5,875,301 A | | 2/1999 | Duckwall et al. |
| 5,935,208 A | * | 8/1999 | Duckwall et al. ........... 709/221 |
| 6,157,972 A | * | 12/2000 | Newman et al. ............ 710/100 |
| 6,199,119 B1 | * | 3/2001 | Duckwall et al. .............. 710/8 |
| 6,304,553 B1 | * | 10/2001 | Gehman et al. ............ 370/235 |
| 6,324,611 B1 | * | 11/2001 | Nyu ............................ 710/305 |
| 6,374,316 B1 | * | 4/2002 | James et al. ................. 710/104 |
| 6,496,583 B1 | * | 12/2002 | Nakamura et al. .......... 380/268 |
| 6,529,977 B1 | * | 3/2003 | Nyu ............................ 710/100 |
| 6,647,446 B1 | * | 11/2003 | James et al. ................. 710/100 |

FOREIGN PATENT DOCUMENTS

EP    0 966 130    12/1999

* cited by examiner

Primary Examiner—Wellington Chin
Assistant Examiner—Jamal A. Fox
(74) Attorney, Agent, or Firm—Frommer Lawrence & Haug LLP; William S. Frommer; Samuel S. Lee (57) ABSTRACT

A data network has a bus to which are connected a given node, a parent node and a child node; and arbitration over acquisition of the bus is performed before data is communicated between nodes. Transition to an initial state in a self identification phase, in which the given node is enabled to respond to an arbitration signal received from the parent node, is controlled by receiving at the given node a SELF_ID packet representative of the child node, as well as the arbitration signal (SELF_ID_GRANT) from the parent node, which would enable the given node to transmit to the parent node a SELF_ID packet representative of the given node. The initial state is assumed at the given node, from which the SELF_ID packet is permitted to be transmitted from the given node to the parent node, if reception of the arbitration signal from the parent node is completed at the given node.

8 Claims, 10 Drawing Sheets

FIG. 3A
(BUS INITIALIZATION)

FIG. 3B
(TREE IDENTIFICATION)

FIG. 3C
(SELF IDENTIFICATION)

CONTROLLING THE STATE OF A NODE CONNECTED TO A BUS DURING THE SELF IDENTIFICATION PHASE OF BUS ARBITRATION

BACKGROUND OF THE INVENTION

1. Field of the Invention

This invention relates to a technique for controlling the state of a node connected to a bus during bus arbitration, and is particularly related to controlling the self identification phase of a device connected to an IEEE 1394 bus. The invention is particularly useful in preventing a given node from transmitting a SELF_ID packet to a parent node when the parent is not yet ready to receive that packet.

2. Description of Related Art

A protocol has been developed for transmitting data at high speeds over a high performance serial bus to which several devices (referred to as "nodes") are connected, wherein each device may be electrically connected to or disconnected from the bus while the bus is in a "powered on" state. This protocol, known as the IEEE 1394 standard, provides for high speed data transmission and real-time transfer of data between multimedia devices. Consistent with this standard, data transfer speeds of 100 Mbps (the actual data speed is 98.304 Mbps), 200 Mbps (the actual data speed is 196.60 Mbps) and 400 Mbps (the actual data speed is 393.216 Mbps) all may be accommodated on the bus. One device, or node, is connected to another device, or node, by a port; and a port that is operable at a higher data transfer speed also is compatible with a lower data transfer speed. Consequently, devices operable at 100 Mbps, 200 Mbps and 400 Mbps all may be connected in the same data network.

Figure 1:
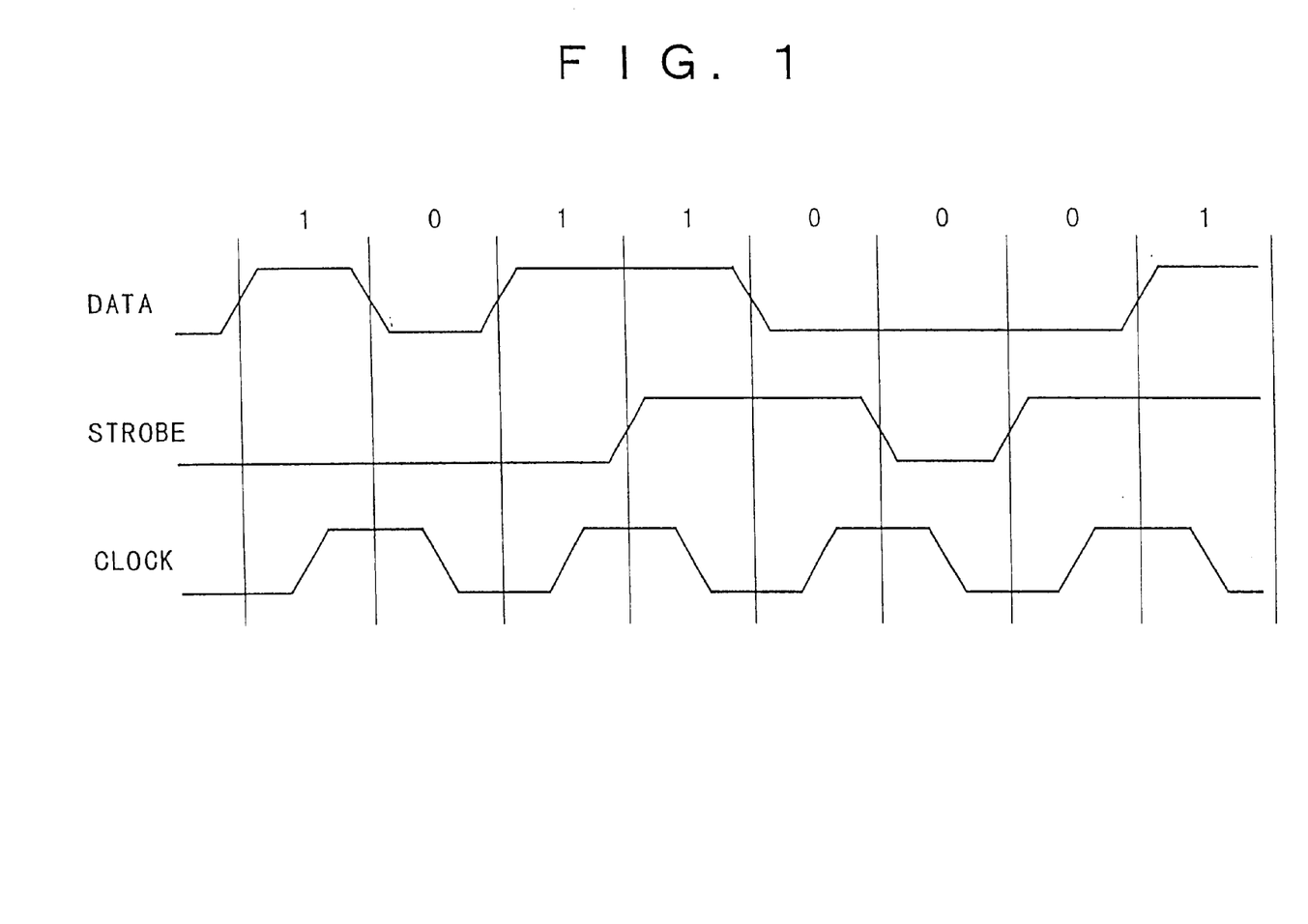
FIG. 1 is a schematic waveform diagram of the data and strobe signals transmitted on, for example, an IEEE 1394 bus.

The IEEE 1394 protocol adopts the format known as the data/strobe link (DS-Link) in which data is transferred by using two signals on, for example, two different sets of connectors, with one signal representing the data and the other representing the strobe, such as shown in FIG. 1. It will be appreciated that the strobe signal is a two-level signal whose state changes when the data level remains the same for consecutive bit cells. By using this DS-Link method, a data clock may be readily recovered by "exclusive-OR-ing" the data and strobe signals.

Figure 2:
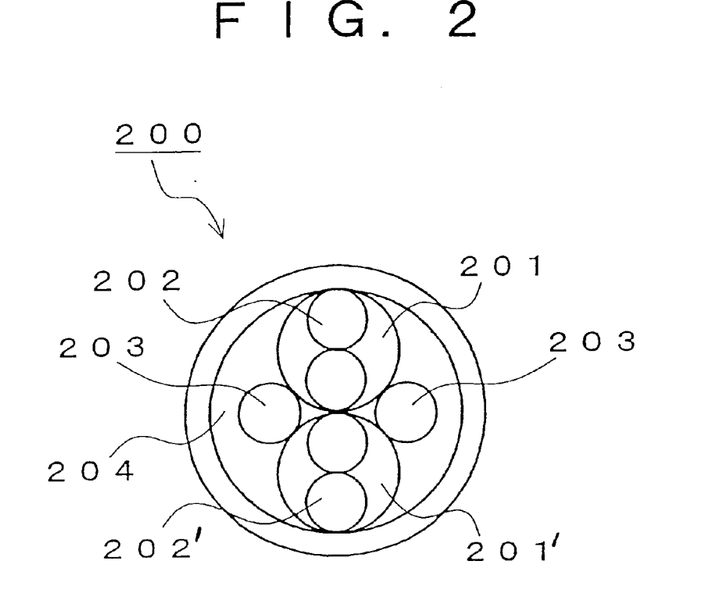
FIG. 2 is a schematic representation of the cable used as an IEEE 1394 bus.

The cable that is used in the network employing the IEEE 1394 protocol is schematically illustrated in FIG. 2 as cable 200, wherein a first twisted pair cable 202 (sometimes referred to as TP A) and a second twisted pair cable 202' (sometimes referred to as TP B) are disposed in respective shield layers 201 and 201', and these shielded twisted pair cables are further disposed within a second shield layer 204 in which power supply lines 203 also are located. Each twisted pair cable provides data and strobe signals to the nodes that are connected thereto. A more detailed description of the electrical interface between the twisted pair cables and the nodes which are connected by these cables is found in Fire Wire System Architecture IEEE 1394, MindShare, Inc., Don Anderson (1998), which is incorporated herein by reference.

As described in the aforementioned text, signaling between nodes is effected by using both TP A and TP B to which strobe and data drivers are connected. Three signal states are used: 1, 0 and Z, wherein the Z state is represented when a driver is disabled. Before signaling commences, arbitration must be conducted among the nodes to select the proper node that is permitted to acquire the bus. Similarly, when devices are connected to or disconnected from the bus, bus topology reconfiguration automatically is conducted; and this bus topology reconfiguration is analogous to bus arbitration. The states 1, 0 and Z are used to represent control signals, such as shown in Tables 1, 2 and 3; and the transmission of arbitration signals are interpreted in the manner represented by Tables 4 and 5.

TABLE 1

| Transmit arbitration signal A | Drivers | | |
|---|---|---|---|
| (Arb_A-Tx) | Strb_Tx | Strb_Enable | Comment |
| Z | — | 0 | TPA driver is disabled |
| 0 | 0 | 1 | TPA driver is enabled, strobe is low |
| 1 | 1 | 1 | TPA driver is enabled, strobe is high |

TABLE 2

| Transmit arbitration signal A | Drivers | | |
|---|---|---|---|
| (Arb_A-Tx) | Strb_Tx | Strb_Enable | Comment |
| Z | — | 0 | TPA driver is disabled |
| 0 | 0 | 1 | TPB driver is enabled, data is low |
| 1 | 1 | 1 | TPB driver is enabled, data is high |

TABLE 3

| Received arbitration comparator Value (Arb_$n^a$_Rx) | Transmitted arbitration signal for this port (Arb_$n^a$_Tx) | Interpreted arbitration signal (Arb_$n^a$) | Comment |
|---|---|---|---|
| Z | Z | Z | If this port is transmitting a Z, then the received signal will be the same as transmitted by the port on the other end of the cable. |
| 0 | Z | 0 | |
| 1 | Z | 1 | |
| Z | 0 | 1 | If the comparator is receiving a Z while this port is sending a 0, then the other port must be sending a 1. This is the first half of the 1's dominance rule. |
| 0 | 0 | 0 | The other port is sending a 0 or a Z. |
| Z | 1 | 1 | The other port must be sending a 0. This is the other half of the 1's dominance rule. |
| 1 | 1 | 1 | The other port is sending a 1 or a Z. |

TABLE 4

| arbitration transmit | | | |
|---|---|---|---|
| (Arb_A-Tx) | (Arb_B_Tx) | Line state name | Comment |
| Z | Z | IDLE | sent to indicate a gap |
| Z | 0 | TX_REQUEST | sent to parent to |

TABLE 4-continued arbitration transmit

| (Arb_A-Tx) | (Arb_B_Tx) | Line state name | Comment |
|---|---|---|---|
| | | TX_GRANT | request the bus sent to child when bus is granted |
| 0 | Z | TX_PARENT_NOTIFY | sent to parent candidate during tree-ID |
| 0 | 1 | TX_DATA_PREFIX | sent before any packet data and between blocks of packet data in the case of concatenated subactions |
| 1 | Z | TX-CHILD-NOTIFY | sent to child to acknowledge the parent_notify |
| | | TX_IDENT_DONE | sent to parent to indicate that self-ID is complete |
| 1 | 0 | TX_DATA_END | sent at the end of packet transmission |
| 1 | 1 | BUS_RESET | sent to force a bus reconfiguration |

TABLE 5

Interpreted arbitration signals

| Arb_A | Arb_B | Line state name | Comment |
|---|---|---|---|
| Z | Z | IDLE | the attached peer PHY is inactive |
| Z | 0 | RX_PARENT_NOTIFY | the attached peer PHY wants to be a child |
| | | RX_REQUEST_CANCEL | attached peer PHY has abandoned a request (this PHY is sending a grant) |
| Z | 1 | RX_IDENT_DONE | the child PHY has completed its self-ID |
| 0 | Z | RX_SELF_ID_GRANT | the parent PHY is granting the bus for self-ID |
| | | RX_REQUEST | a child PHY is requesting the bus |
| 0 | 0 | RX_ROOT_CONTENTION | the attached peer PHY and this PHY both want to be a child |
| | | RX_GRANT | the parent PHY is granting control of the bus |
| 0 | 1 | RX_PARENT_HANDSHAKE | attached peer PHY acknowledges parent_notify |
| | | RX_DATA_END | the attached peer PHY has finished sending a block of data is about to release the bus |
| 1 | Z | RX_CHILD_HANDSHAKE | attached peer PHY acknowledges TX_CHILD_NOTIFY (the peer PHY is a child of this PHY) |
| 1 | 0 | RX_DATA_PREFIX | the attached peer PHY is about to send packet data or has finished sending a block of packet data and is about to send more |
| 1 | 1 | BUS_RESET | send to force a bus reconfiguration |

Figure 3A:
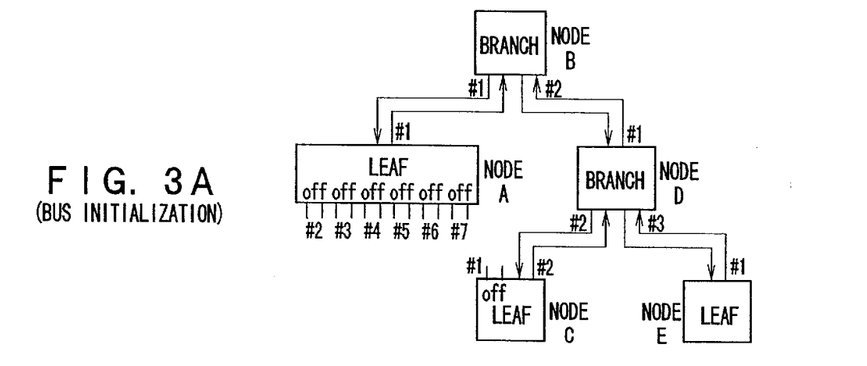
FIGS. 3A–3C are block diagrams representing the configuration of a network.

Device configuration occurs locally on the bus without the intervention of a host processor. Each time a new device, or node, is connected to or disconnected from the bus, the entire bus is reset and reconfigured. This is what has been mentioned above as automatic topology reconfiguration. Bus reconfiguration is executed by first performing bus initialization, then performing tree identification and finally performing self identification. In the bus initialization phase, all the nodes return to their initialized states regardless of their prior configurations. That is, all topology information is cleared from the nodes. The only information known to a node is whether that node is a branch (that is, whether the node is connected to two or more nodes) or a leaf (that is, whether the node is connected to only one other node) or is isolated. FIG. 3A schematically illustrates a network consisting of branch and leaf nodes at the bus initialization phase.

Figure 3B:
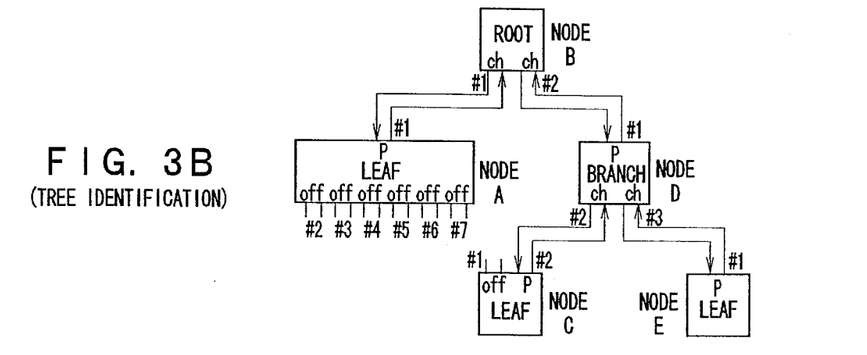

In the tree identification phase, the entire network topology is viewed as a single tree. The aforementioned Fire Wire System Architecture text describes that after tree identification, one node has the status of the root node; and all connections to the root node are identified as "root" directions toward the root node. Nodes are connected by connecting one port to another; and the port closest to the root node is referred to as the "parent" port. Parent ports are connected to "child" ports; and the node that is connected only to "child" nodes, that is, the node whose ports are connected only to parent ports, is the root node. FIG. 3B illustrates the network after completing the tree identification process; and those ports which are labeled "off" are not connected to any further port. It is appreciated that parent ports are labeled "p" and child ports are labeled "ch". The ports of node B are seen to be connected only to parent ports: the parent port of node A and the parent port of node D.

Following tree identification, the self identification phase takes place. In self identification, physical IDs are assigned to each node; neighboring nodes exchange transmission speed capabilities; and the established network topology is broadcasted to all nodes. This is described more particularly in the aforementioned Fire Wire text. In addition, one of the nodes in the network is designated the management node, and this is used to provide low level management of the nodes and the network and to create a network topology map which identifies the speed capabilities of the respective data paths in the network.

In the self identification phase, the root node determines how many nodes exist in the network, and each node is assigned a unique physical identifier, or ID. An arbitration grant signal (TPA=Z and TPB=0) issues to the lowest numbered port while a data prefix issues to the other ports. The arbitration grant is transferred from each branch node to its lowest numbered port until a leaf node is reached. When the lowest leaf receives the arbitration grant, it assigns to itself the physical ID of 0. The physical ID is broadcast in SELF_ID packets. The self_ID count in all nodes is reset to zero, and the nodes increment their self_ID count after each SELF_ID packet is broadcast. In this manner, the physical ID of a particular node is set to its self_ID count.

Figure 3C:
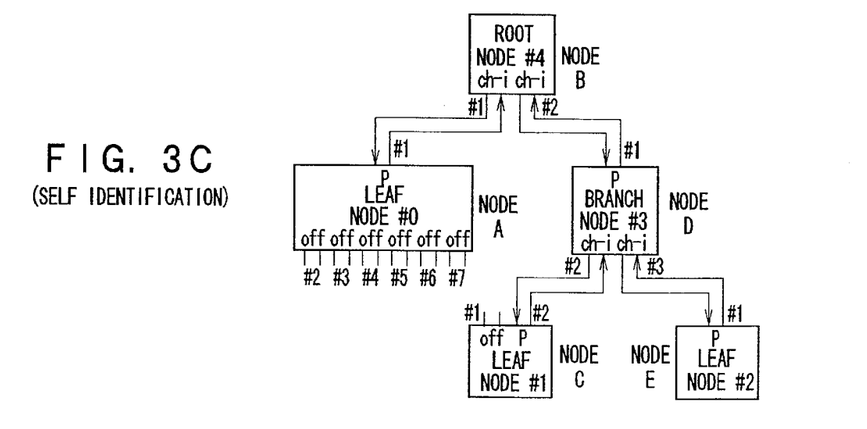

In self identification, once a particular node and all the "child" nodes connected thereto have completed their identification processing, that node transmits an "ident_done" signal. Thereafter, the next higher node, as represented by its self_ID, performs the identification processing. As a result, all of the nodes and particularly the physical ID of the nodes in a reconfiguration, are identified. The self identification process is recognized as being completed when a bus is idle for a subaction gap period. FIG. 3C illustrates the completion of the self identification process in the network, with the nodes being identified by their respective physical IDs. As before, the ch port of the node is connected to a child node and the p port of the node is connected to a parent node.

Figure 4:
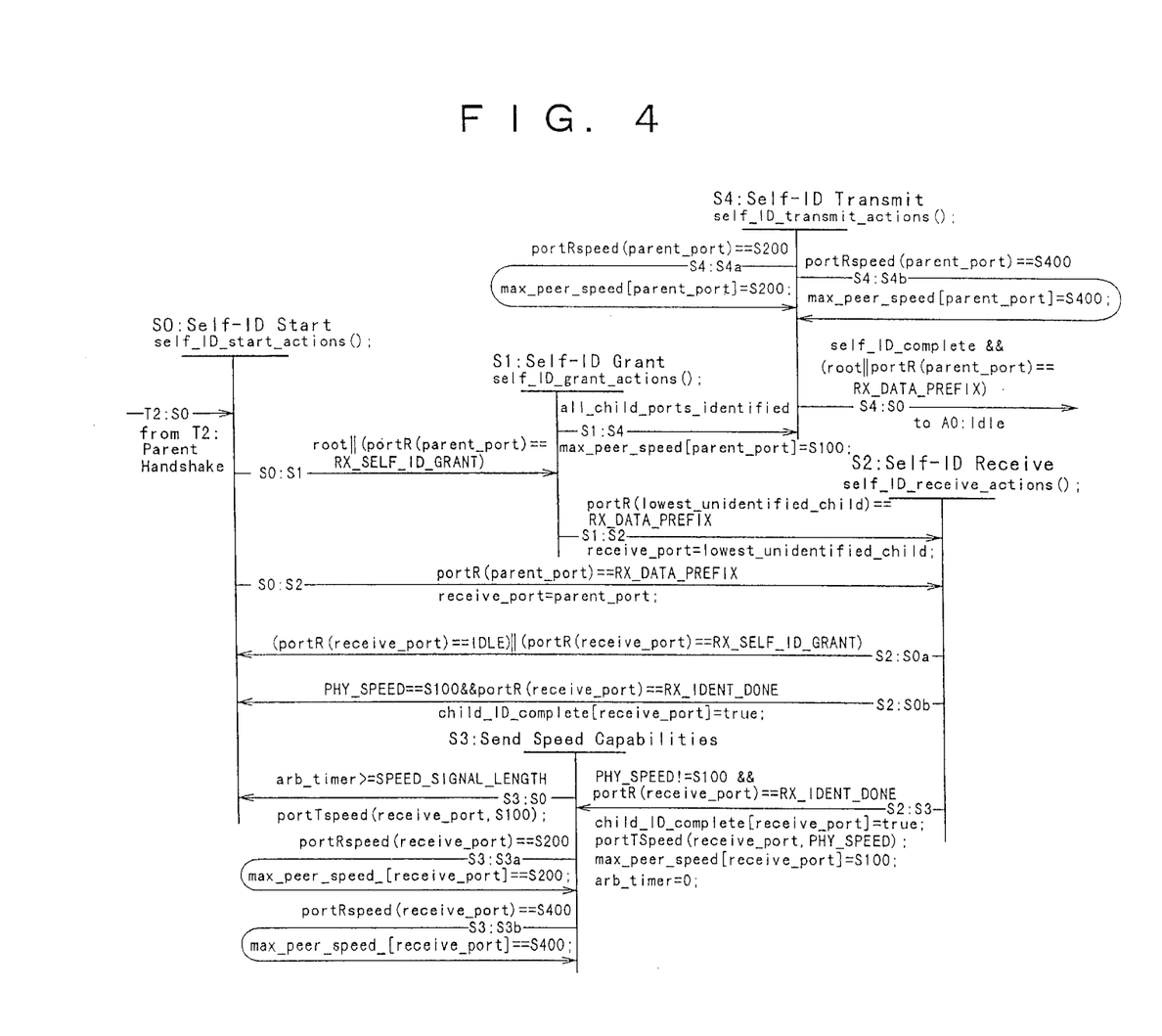
FIG. 4 is a state, or transition, diagram representing the self identification phase of a network.

FIG. 4 represents a state, or transition, diagram of the self identification phase, in which the following states are illustrated: S0 (Self-ID Start), S1 (Self-ID Grant), S2 (Self-ID Receive), S3 (Send Speed Capabilities) and S4 (Self-ID Transmit).

Figure 5:
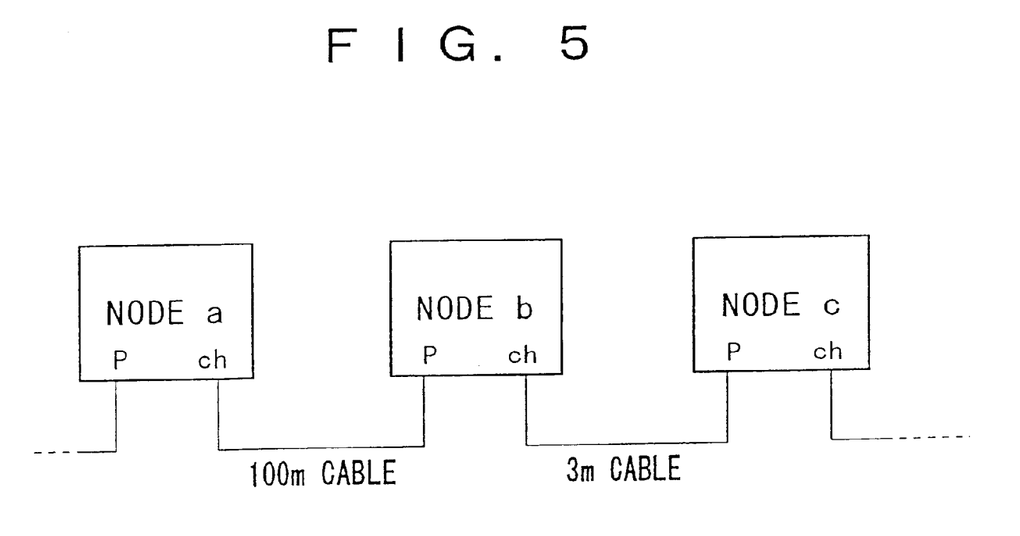
FIG. 5 is a block diagram of a simple network.

Let it be assumed that nodes a, b and c are connected in the manner shown in FIG. 5. Let it be further assumed that the length of the cable between nodes a and b is 100 m and the length of the cable between nodes b and c is 3 m. In the illustrated configuration, when tree identification is completed, node a is the parent of node b and node b is the parent of node c. When in the self identification phase, node b receives the arbitration signal RX_SELF_ID from node a and node b transmits to node c the arbitration signal TX_GRANT, as shown in FIG. 4. Node c starts to transmit the TX_DATA_PREFIX, whereupon nodes a and b assume their respective SELF_ID packet reception states. Following the transmission of the TX_DATA_PREFIX signal, node c transmits its SELF_ID packet. Node b expects to receive from node c the SELF_ID packet, RX_DATA_END and RX_IDENT_DONE, whereafter node b awaits reception of the RX_SELF_ID_GRANT from node a. However, since the length of cable between node a and node b is 100 m, the transmission delay attributed to this cable is in excess of 500 ns. This means that even after node b completes its transfer of the SELF_ID packet from node c to node a, node b continues to receive from node a the RX_SELF_ID_GRANT arbitration signal that was intended for node c.

Typically, after a predetermined time has elapsed at node b from the time that node b receives the SELF_ID packet from node c, such as after about 500 ns, the state of node b is changed to the state in which node b is ready to send to node a the SELF_ID packet, provided that node b receives from node a the RX_SELF_ID_GRANT. However, as just mentioned, at the conclusion of this predetermined time period, node b is, in fact, receiving the delayed RX_SELF_ID_GRANT from node a. Thus, node b is likely to misinterpret the RX_SELF_ID_GRANT; and, as a result, node b may transmit its own SELF_ID packet at the same time that it is broadcasting the SELF_ID packet received from node c. Consequently, node a will receive SELF_ID packets from node b and from node c, resulting in a malfunction at node a.

If the inherent time delay in the cable between node a and node b is greater than the sum of the duration of the DATA_PREFIX (140 ns) plus the duration of the SELF_ID packet (about 640 ns) and the duration of the DATA_END (240 ns) then node b will continue to receive the arbitration signal RX_SELF_ID_GRANT from node a and will likely misinterpret this arbitration signal. Since data processing in the nodes is not instantaneous, that is, a discrete time is needed to generate and transmit the aforementioned signals, the problem of misinterpreting arbitration signals at node b is likely to occur if the cable length between node a and node b is about 80 m.

OBJECTS OF THE INVENTION

Therefore, it is an object of the present invention to provide a technique that is particularly useful in the self identification phase of configuring a data network in which nodes may be separated by large distances.

Another object of this invention is to provide self identification processing of nodes in a data network in which a large time delay may be present.

A further object of this invention is to provide a technique for preventing the premature transition of a node to an initial state in the self identification phase, thereby obviating ambiguity in interpreting arbitration signals.

Various other objects, advantages and features of the present invention will become readily apparent from the ensuing detailed description, and the novel features will be particularly pointed out in the appended claims.

SUMMARY OF THE INVENTION

In accordance with the present invention, a technique is provided for controlling transition to an initial state in the self identification phase of a data network which has a bus to which are connected a given node, a parent node and a child node, and wherein arbitration over acquisition of the bus is performed before data is communicated between the nodes. The initial state is the state whereby a node, such as the given node, is enabled to respond to an arbitration signal received from the parent node. The given node receives a SELF_ID packet representative of the child node, and said given node also receives an arbitration signal (SELF_ID_GRANT) from the parent node which enables the given node to transmit to the parent node a SELF_ID packet representative of the given node. The given node assumes the initial state, from which the SELF_ID packet is permitted to be transmitted from the given node to the parent node, if reception of the arbitration signal from the parent node is completed. However, if the given node continues to receive the arbitration signal from the parent node, the given node does not change to its initial state and, therefore, does not transmit its SELF_ID packet to the parent node.

BRIEF DESCRIPTION OF THE DRAWINGS

The following detailed description, given by way of example and not intended to be limited solely to the embodiments described herein, will best be understood by reference to the accompanying drawings in which.

DETAILED DESCRIPTION OF A CERTAIN PREFERRED EMBODIMENT

Figure 6:
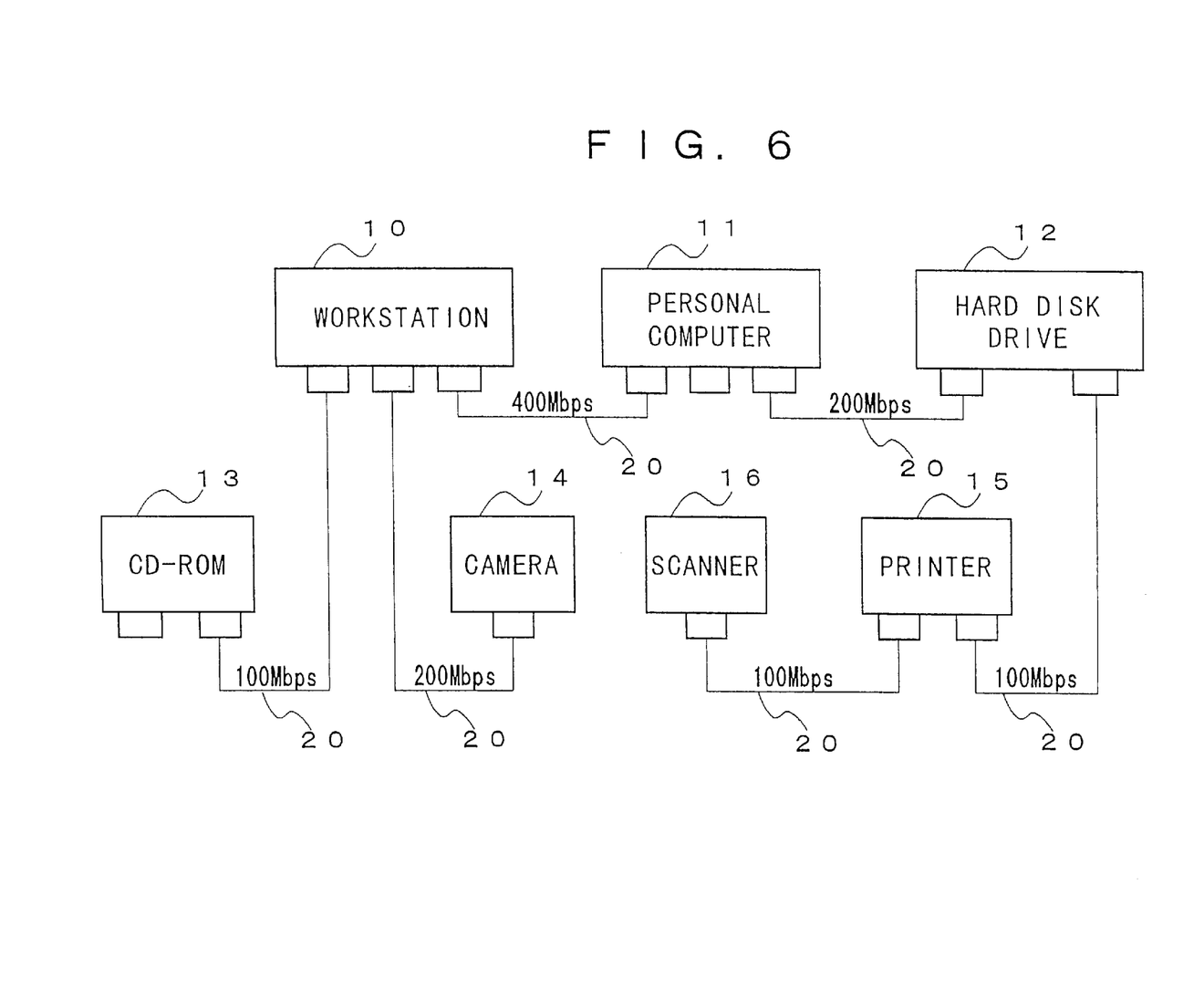
FIG. 6 is a block diagram of a typical IEEE 1394 multimedia network.

Referring now to the drawings, and in particular to FIG. 6, there is illustrated a block diagram of a multimedia network connected in accordance with the IEEE 1394 convention in which the present invention finds ready application. The network includes a work station 10, a personal computer 11, a hard disk drive 12, a CD-ROM 13, and additional peripheral devices, such as a camera 14, a printer 15 and a scanner 16. Each of these devices is a node, and nodes are interconnected by a bus 20 consistent with the IEEE 1394 protocol. As is known, the IEEE 1394 convention typically connects nodes in accordance with two techniques: a digital chain and node branching. When using a digital chain connection, a maximum of 16 nodes having 1394-ports may be connected. When using both the digital chain and node branching connections, a maximum of 63 nodes may be connected. As is typical in the IEEE 1394 convention, a node, or piece of equipment, can be electrically connected to or disconnected from the network even while other pieces of equipment are operating, that is, even while the network is powered on. When a node is added or removed, the network topology is reconfigured first by entering the bus initialization phase, then the tree identification phase, and finally, the self identification phase. These phases have been described above and further description thereof need not be provided.

Figure 7:
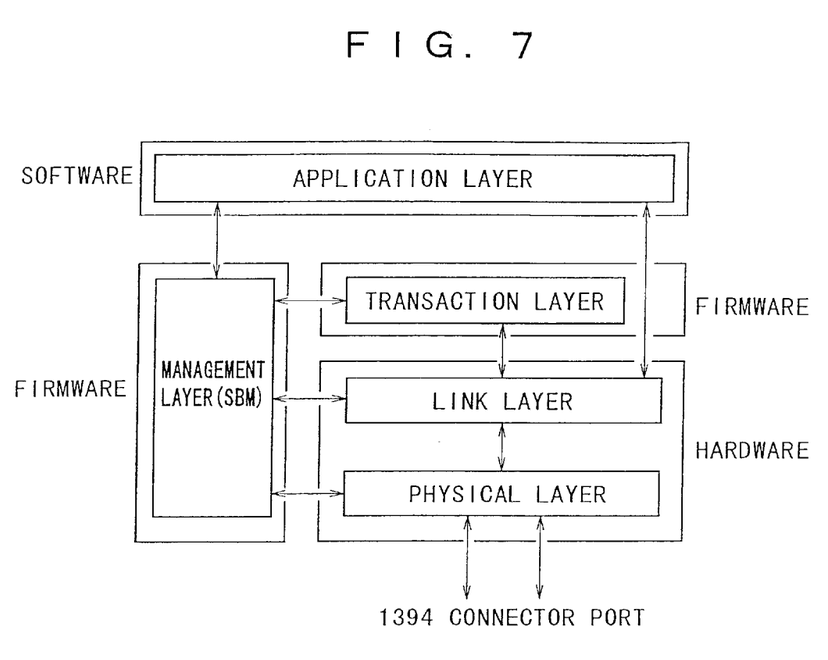
FIG. 7 is a block diagram representing the protocol architecture of the IEEE 1394 convention.

Turning now to FIG. 7, there is illustrated a block diagram of the protocol architecture of a typical IEEE 1394 interface. Here, the interface is comprised of both hardware and firmware. The hardware is formed of a physical layer (PHY) and a link layer. Signals are transmitted or received on the physical layer and the link layer is comprised of a host interface and a physical layer interface. The firmware is comprised of a transaction layer formed of a management driver, which operates with the IEEE 1394 interface, and a management layer which includes the network management driver (also referred to as the serial bus management, or SBM). An application layer includes management software which serves as an interface between the software used by a user of the piece of equipment and the transaction layer and management layer.

Figure 8:
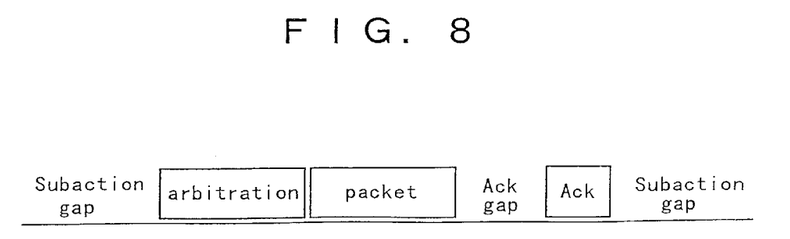
FIG. 8 is a schematic representation of an asynchronous packet used in the IEEE 1394 protocol.
Figure 9A:
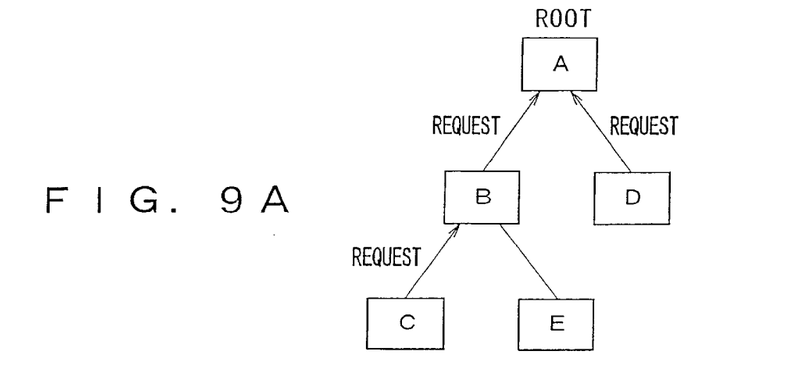
FIGS. 9A and 9B are useful in explaining arbitration in an IEEE 1394 network.
Figure 9B:
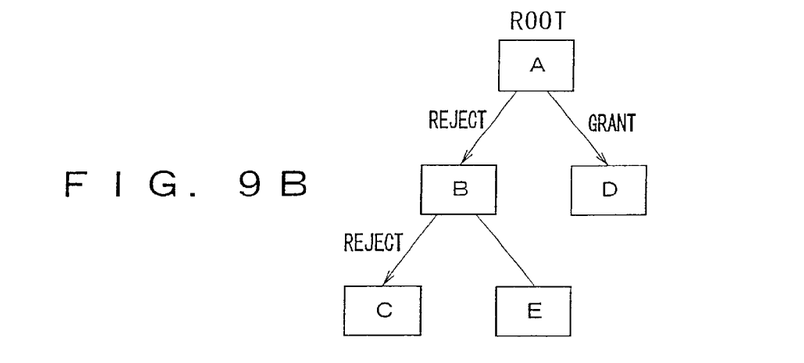

Consistent with IEEE 1394 protocol, transferor operations are conducted on the network as subactions. Typically, two subactions are the "asynchronous" mode and the "isochronous" mode, the latter being a real-time transfer mode in which a band of information is transferred. Each subaction includes two transfer states, namely, "arbitration" and "packet transmission." The subaction in the asynchronous mode also includes a third transfer state, namely, "acknowledgment." FIG. 8 is a schematic representation of the asynchronous subaction in which the initial subaction gap is indicative of a bus idle state. By monitoring the duration of this subaction gap, it can be determined whether a previous asynchronous transfer has been completed and whether a new asynchronous transfer may be initiated. If the subaction gap continues for more than a predetermined time duration, a node which wishes to transfer or receive data recognizes that the bus is in its idle state and, thus, is available for use. Arbitration for bus acquisition then may be performed. For example, node A, as shown in FIGS. 9A and 9B, is the root node and determines which of the other nodes is permitted to use the bus. After arbitration of the right to acquire the bus, node A executes data transfer by way of data packet transmission (see FIG. 8). After a data packet is transferred, the node which receives the data packet executes a response acknowledgment by returning the "ack" code as a function of what has been received. Thus, acknowledgment processing, that is, the content of the "ack" code, serves to acknowledge that data transfer was properly performed at both the transmission node and the reception node. The network then returns to the subaction gap (shown in FIG. 8) and the aforementioned data transfer operation is repeated.

Figure 10:
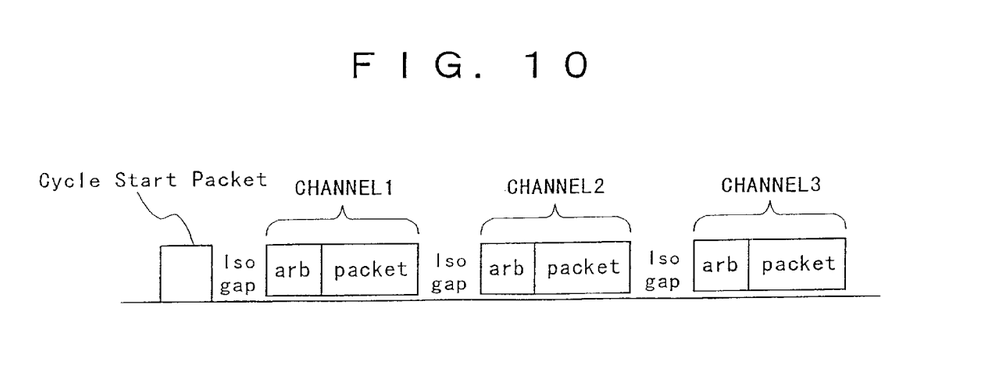
FIG. 10 is a schematic representation of an isochronous packet used in the IEEE 1394 protocol.

In the isochronous subaction, as shown in FIG. 10, data transfer begins after the root node issues a cycle start packet. Consistent with the IEEE 1394 convention, the cycle start packet is repetitive at a frequency of about 8 kHz. Following the cycle start packet are the isochronous gap, the arbitration signal and the data transfer packet for each of a number of channels. As is seen in FIG. 10, the isochronous gap, arbitration signal and data transfer packet are repeated sequentially for the respective channels. Isochronous transfer is executed in preference to asynchronous transfer; and isochronous transfer effects the transfer of data in real time.

Figure 11:
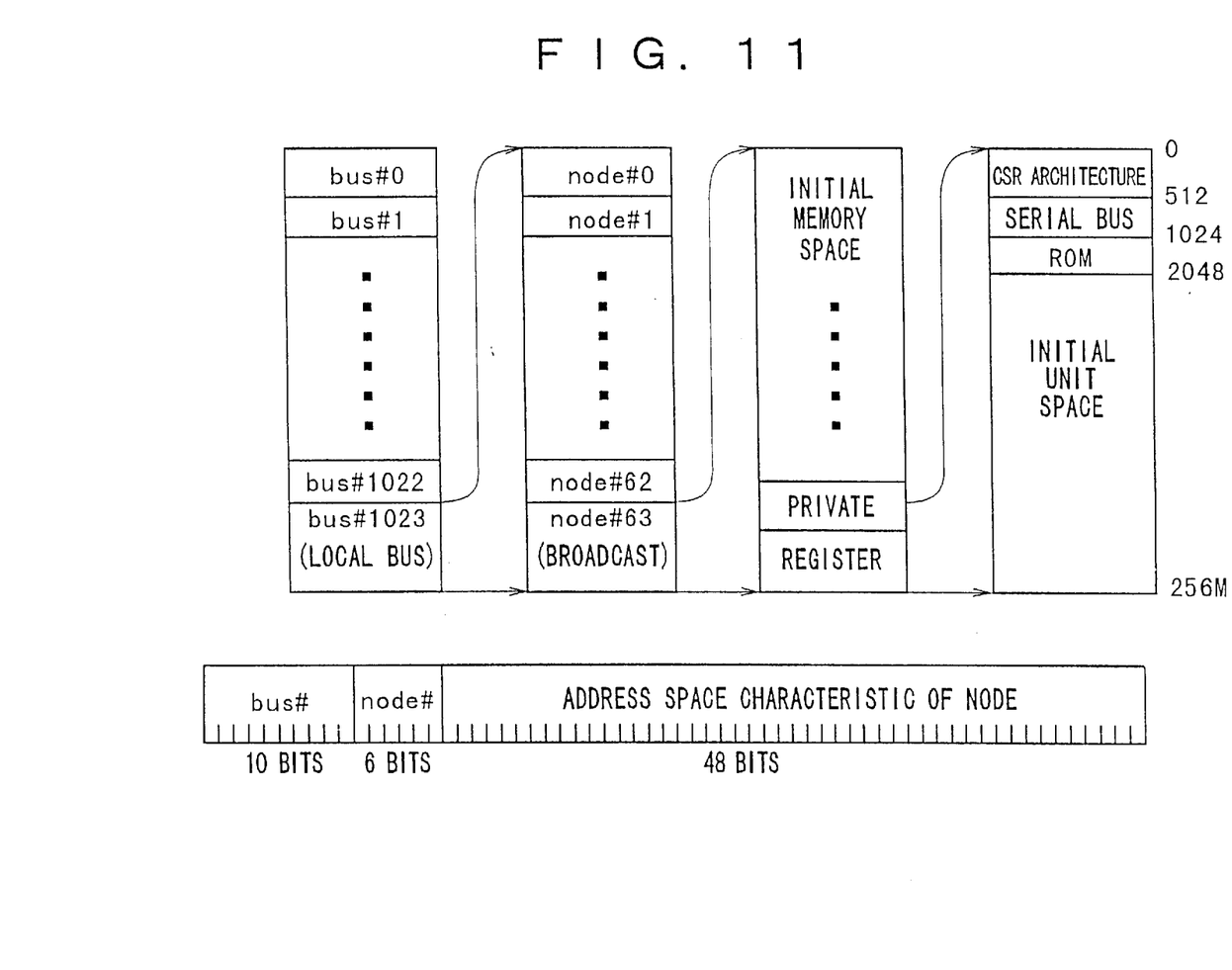
FIG. 11 is a schematic representation of the address scheme used in CSR architecture.

Turning now to FIG. 11, there is illustrated an addressing scheme in accordance with the control and status register (CSR) architecture. This addressing scheme is formed of 64 bits, with the upper 16 bits denoting a node ID and furnishing a maximum node address space of 64K. In actuality, the upper 10 bits of these 16 bits of the node ID represent a bus ID for discriminating the buses of the IEEE 1394 serial buses, with the lower 6 bits serving as the physical ID for discriminating the respective nodes. Thus, 1023 buses and 63 nodes can be specified by these 16 address bits. The remaining 48 bits define 256 terabyte address space to designate the address space accorded to the nodes. The space defined by the upper 20 of these bits is divided into an initial register space, used for 2048-byte registers that are utilized by CSR registers that are utilized by IEEE 1394; a private space; and an initial memory space. On the other hand, if the upper 20 bits of the space defined by the remaining 48 bits is used as the initial register space, then the space defined by the lower 28 bits is used as a plug control register or as an initial unit space to accommodate node-specific usages.

Figure 12:
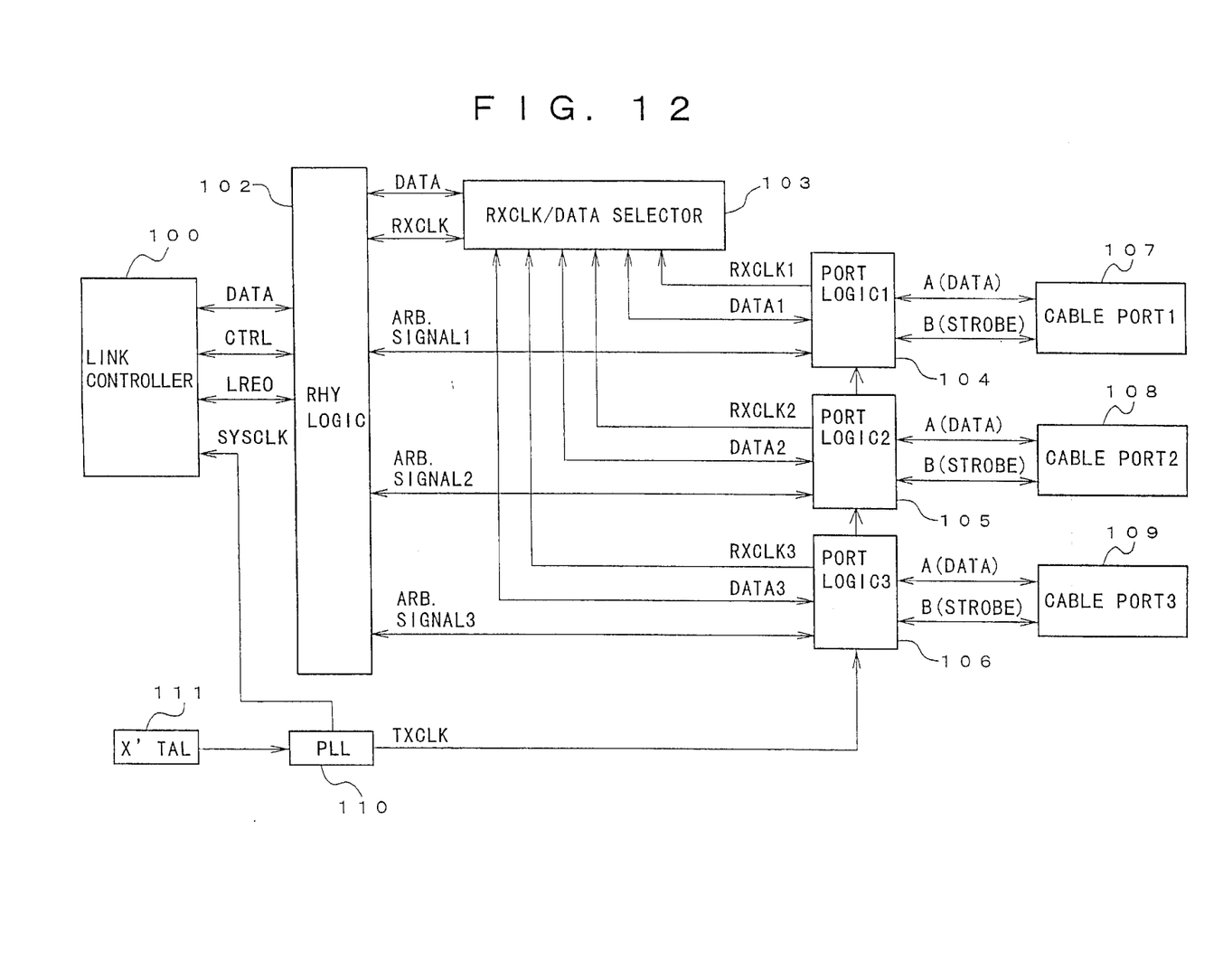
FIG. 12 is a block diagram of one example of the physical layer of a node.

The physical layer of the node in accordance with the IEEE 1394 standard is represented by the block diagram shown in FIG. 12 and includes a physical layer logic block (PHY LOGIC) 102, a selector block (RXCLOCK/DATA SELECTOR) 103, respective port logic blocks (PORT LOGIC 1, PORT LOGIC 2 and PORT LOGIC 3) 104, 105 and 106, cable ports (CABLE PORT 1, CABLE PORT 2 and CABLE PORT 3) 107, 108 and 109, and a clock generator (PLL) 110. Physical layer logic block 102 exercises I/O control and arbitration control over the link layer by being connected to a link layer controller 100. The physical layer logic block also is connected to selector block 103 and to the port logic blocks 104, 105 and 106.

Selector block 103 selects DATA 1, DATA 2 or DATA 3 supplied from port logic block 104, 105 or 106, respectively, as supplied thereto by cable port 107, 108 or 109, respectively. Depending upon the data that is selected by the selector block, the receive clock RXCLOCK 1, RXCLOCK 2 or RXCLOCK 3 also is selected; and the selected data and receive clock are supplied by selector block 103 from the corresponding port logic block to physical layer logic block 102. When the node illustrated in FIG. 12 transmits data, the data and receive clock supplied to physical layer logic block 102 are transferred to a selected one of the port logic blocks for transmission to the cable port connected thereto and thence to the node coupled to that cable port. When the node shown in FIG. 12 receives data, that data is received over the one cable port that is active, and the data, along with its receive clock, are supplied from the port logic block connected to the active cable port through selector block 103 to physical layer logic block 102. For example, if packet data DATA 1 and its receive clock RXCLOCK 1 are received by port logic block 104 from active cable port 107, selector block 103 supplies this packet data and its receive clock to physical layer logic block 102 whereat that data is written into a FIFO memory at a rate determined by receive clock RXCLOCK 1. Subsequently, this packet data is read from the FIFO memory at the system clock rate SYSCLK determined by clock generator 110.

As one example, port logic block 104 transmits and receives an arbitration signal ARB 1 and data DATA 1 through cable port 107. In addition, the port logic block generates the receive clock RXCLOCK 1 from the data and strobe signals supplied by cable port 107. During arbitration, the arbitration signal ARB 1 is transmitted to port logic block 104 from physical layer logic block 102. During data transmission, port logic block 104 converts packet data DATA 1 received from physical layer logic block 102 by way of selector block 103 into serial data by using the transmission clock TXCLOCK generated by clock generator 110; and this serial data is transmitted to the node coupled to cable port 107. During data reception, data received from the node coupled to cable port 107 is converted to DATA 1 and receive clock RXCLOCK 1 by port logic block 104; and this converted data and receive clock are supplied by selector block 103 to physical layer logic block 102.

As another example, port logic block 105 transmits and receives an arbitration signal ARB 2 and data DATA 2 through cable port 108. In addition, the port logic block generates the receive clock RXCLOCK 2 from the data and strobe signals supplied by cable port 108. During arbitration, the arbitration signal ARB 2 is transmitted to port logic block 105 from physical layer logic block 102. During data transmission, port logic block 105 converts packet data DATA 2 received from physical layer logic block 102 by way of selector block 103 into serial data by using the transmission clock TXCLOCK generated by clock generator 110; and this serial data is transmitted to the node coupled to cable port 108. During data reception, data received from the node coupled to cable port 108 is converted to DATA 2 and receive clock RXCLOCK 2 by port logic block 105; and this converted data and receive clock are supplied by selector block 103 to physical layer logic block 102. DATA 2 is written into the FIFO memory in physical layer logic block 102 by receive clock RXCLOCK 2.

As a further example, port logic block 106 transmits and receives an arbitration signal ARB 3 and data DATA 3 through cable port 109. In addition, the port logic block generates the receive clock RXCLOCK 3 from the data and strobe signals supplied by cable port 109. During arbitration, the arbitration signal ARB 3 is transmitted to port logic block 106 from physical layer logic block 102. During data transmission, port logic block 106 converts packet data DATA 3 received from physical layer logic block 102 by way of selector block 103 into serial data by using the transmission clock TXCLOCK generated by clock generator 110; and this serial data is transmitted to the node coupled to cable port 109. During data reception, data received from the node coupled to cable port 109 is converted to DATA 3 and receive clock RXCLOCK 3 by port logic block 106; and this converted data and receive clock are supplied by selector block 103 to physical layer logic block 102. DATA 3 is written into the FIFO memory in physical layer logic block 102 by receive clock RXCLOCK 3.

Each of the cable ports 107, 108 and 109 drives a twisted pair cable with the signals supplied from a respective one of the port logic blocks 104, 105 and 106; and each of the cable ports converts the signals received from the twisted pair cable to a level compatible with the port logic block.

Clock generator 110 generates the system clock SYSCLK of a frequency equal to 49.152 MHz and the transmission clock TXCLOCK of a frequency equal to 98.304 MHz from the 24.576 MHz clock supplied thereto by a crystal oscillator 111.

Figure 13:
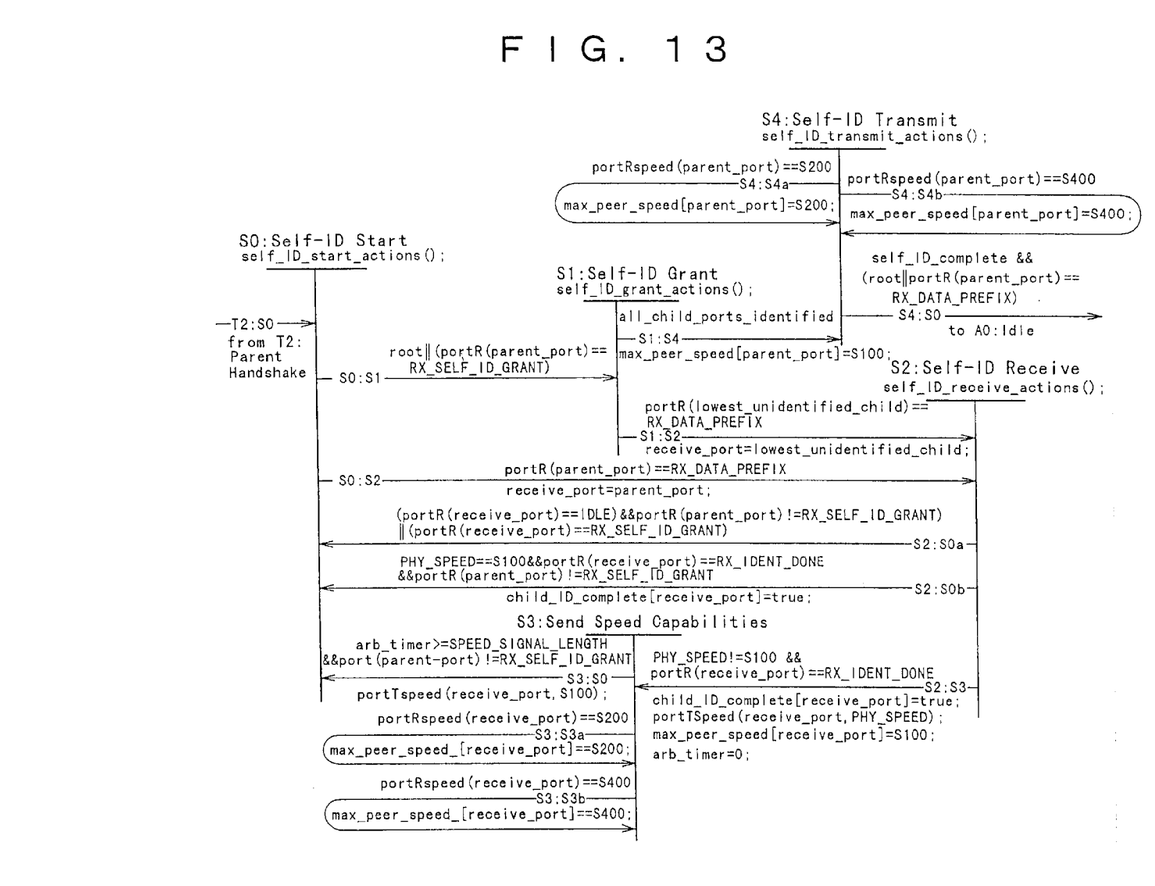
FIG. 13 is a state, or transition, diagram of the self identification phase which incorporates the present invention.

In accordance with the present invention, the self identification phase for automatic topology configuration is carried out in accordance with the state, or transition, diagram illustrated in FIG. 13. It will be appreciated that, even if a long cable is used to connect a node with a parent node, the node is prevented from misinterpreting that the arbitration signal SELF_ID_GRANT destined for a child node is destined for the node itself. This is achieved by adding the conditions (1), (2) and (3) to the transitions of S2:S0*a*, S2: S0*b* and S3:S0 as follows:

(portR(receive_port)==IDLE&&portR(parent_port)!= RX_SELF_ID_GRANT)||(portR(receive_port)==RX_ SELF_ID_GRANT).+tm conditioned (1)

In accordance with this added condition, after reception of the SELF_ID packet from the child node, such that the port coupled to that child node is idle, that is, after node b receives the SELF$_{13}$ ID packet from node c (see FIG. 5), node b does not change to its initial state (S0) unless and until reception of the arbitration signal RX_SELF_ID_ GRANT from the parent node a is completed. Since the node b is prevented from switching to its initial state, the node b is not capable of transmitting, for example, to parent node a, its own SELF_ID packet.

By this invention, another condition (2) is added to selectively control the transition S2:S0*b* as follows:

PHY_SPEED==S100&&portR(receive_port)==RX_IDENT_ DONE

&&portR(parent_port)!=RX_SELF_ID_GRANT.

In accordance with this condition, if the SELF_ID packet has been received at node b from, for example, child node c, node b is set to its speed capability detecting state and this state is changed to the initial state (whereby node b may transmit its SELF_ID packet) if a predetermined time has elapsed and the arbitration signal RX_SELF_ID_GRANT is not received from parent node a.

The present invention imparts a further condition (3) to the transition S3:S0 at, for example, node b, as follows:

arb_timer>=SPEED_SIGNAL_LENGTH&&portR(paraent_ port)!=RX_SELF_ID_GRANT.

This differs from condition (2) in that when node b is set to its speed capability detecting state, this state is not switched to the initial state unless the arbitration signal RX_SELF_ ID_GRANT that is received from the parent node a is completed.

Therefore, by the present invention, in the self identification phase during which the network topology is automatically configured, after a given node, such as node b, receives the SELF_ID packet from its child node, such as node c, the state of node b does not change to its initial state until after reception of the arbitration signal RX_SELF_ ID_GRANT from the parent node a is completed. Consequently, even if a long cable is used to couple the given node to its parent node, misinterpretation of the arbitration signal, that is, misinterpreting the arbitration signal that is destined to child node c as erroneously being sent to the given node b, is avoided. Hence, the given node is prevented from transmitting to its parent node its own SELF_ID packet at the same time that the SELF_ID packet from the child node c is being transmitted to that parent node. This prevents the parent node from ambiguous or erroneous operation. In the preferred embodiment, physical layer logic block 102 includes a microprocessor that is programmed to operate in the self identification phase that has been described above. The programming of such microprocessor is represented by the state diagram of FIG. 13.

While the present invention has been particularly shown and described with reference to a preferred embodiment, it will be really apparent to those of ordinary skill in the art that various changes and modifications may be made without departing from the spirit and scope of the invention. For example, the present invention is not limited solely for use in an IEEE 1394 network. Similarly, the electrical connection between nodes need not be limited solely to twisted pair cables. Rather, other high performance serial bus connections, such as optical fibers, may be used.

Therefore, it is intended that the appended claims be interpreted to cover not only the specific embodiment described herein but all equivalents thereto.

What is claimed is:

1. In a data network having a bus to which are connected a given node, a parent node and a child node, and wherein arbitration over acquisition of the bus is performed before data is communicated between nodes, a method for controlling transition to an initial state in a self identification phase in which said given node is enabled to respond to an arbitration signal received from said parent node, comprising the steps of:

receiving at said given node a SELF_ID packet representative of said child node;

receiving at said given node said arbitration signal (SELF_ID_GRANT) from said parent node, thereby enabling said given node to transmit to said parent node a SELF_ID packet representative of said given node; and assuming said initial state in the self identification phase at said given node, from which said SELF_ID packet is permitted to be transmitted from said given node to said parent node, if the reception of said arbitration signal from said parent node is completed at said given node.

2. The method of claim 1 wherein said given node has a port connected to said child node and a port connected to said parent node; and wherein said initial state is assumed if the port which has received the SELF_ID packet is in a an idle state and the port connected to said parent node does not receive said arbitration signal.

3. The method of claim 1 wherein said given node is capable of communicating at more than one data rate; and further comprising the steps of setting the state at said given node to a speed capability detecting state after said SELF_ID packet representative of said child node has been received, and changing the state at said given node from said speed capability detecting state to said initial state if a predetermined time has elapsed and said arbitration signal is not received from said parent node.

4. In a data network having a bus to which are connected first, second and third devices, and wherein arbitration over acquisition of the bus is performed before data is communicated between devices, said first device comprising:

receiving means for receiving a SELF_ID packet representative of said second device and transmitted from said second device in response to an arbitration signal transmitted from said third device;

state setting means for setting said receiving means to an idle state after said SELF_ID packet is received;

detecting means for detecting the presence of said arbitration signal destined for said second device from said third device; and wherein said state setting means sets said first device to an initial state, for initiating self identification of said first device, if said detecting means does not detect the presence of said arbitration signal destined for said second device.

5. Apparatus as in claim 4, wherein said first device is capable of communicating at more than one data rate; and wherein said state setting means is further operable to set said first device to a speed capability detecting state after said SELF_ID packet has been received, and to change the state of said first device from said speed capability detecting state to said initial state if a predetermined time has elapsed and said arbitration signal destined for said second device is not received from said third device.

6. A physical layer logic unit included in a given node of a data network having a bus to which are connected said given node, a parent node and a child node, wherein said physical layer logic unit carries out bus arbitration before data is communicated through said given node, and wherein said given node receives a SELF_ID packet representative of said child node, said physical layer logic unit controlling transition to an initial state in a self identification phase in which said given node is enabled to respond to an arbitration signal received from said parent node, said physical layer logic unit being programmed to enable said given node to transmit to said parent node a SELF_ID packet representative of said given node after said given node receives an arbitration signal (SELF_ID_GRANT) from said parent node, and to assume said initial state if said arbitration signal from said parent node is not received at said given node.

7. The logic unit of claim 6 wherein said given node has respective ports connected to said child node and to said parent node; and wherein said logic unit is programmed to assume said initial state if the port which has received the SELF_ID packet is in an idle state and the port connected to said parent node does not receive said arbitration signal.

8. The logic unit of claim 6 wherein said given node is capable of communicating at more than one data rate; and said physical layer logic unit is further programmed to set the state at said given node to a speed capability detecting state after SELF_ID packet representative of said child node has been received, and to change the state at said given node from said speed capability detecting state to said initial state if a predetermined time has elapsed and said arbitration signal is not received from said parent node.

* * * * *